(12) United States Patent
Bruning

(10) Patent No.: US 6,756,765 B2
(45) Date of Patent: Jun. 29, 2004

(54) SYSTEM AND METHOD FOR CHARGING USERS TO RECHARGE POWER SUPPLIES IN PORTABLE DEVICES

(75) Inventor: Gert Bruning, Sleepy Hollow, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/266,273

(22) Filed: Oct. 8, 2002

(65) Prior Publication Data

US 2004/0066169 A1 Apr. 8, 2004

(51) Int. Cl.$^7$ ................................................ H02J 7/00
(52) U.S. Cl. ....................................................... 320/108
(58) Field of Search ................................ 320/107, 108, 320/110, 111; 307/64, 66

(56) References Cited

U.S. PATENT DOCUMENTS

| | | | | |
|---|---|---|---|---|
| 5,187,423 A | * | 2/1993 | Marton | 320/109 |
| 5,608,771 A | | 3/1997 | Steigerwald et al. | 378/15 |
| 5,631,536 A | * | 5/1997 | Tseng | 320/137 |
| 6,067,008 A | | 5/2000 | Smith | 340/438 |
| 6,184,651 B1 | | 2/2001 | Fernandez et al. | 320/108 |
| 6,191,501 B1 | * | 2/2001 | Bos | 307/64 |
| 6,331,744 B1 | | 12/2001 | Chen et al. | 310/171 |
| 6,446,049 B1 | * | 9/2002 | Janning et al. | 705/40 |
| 6,466,658 B2 | * | 10/2002 | Schelberg, Jr. et al. | 320/111 |

FOREIGN PATENT DOCUMENTS

| | | | |
|---|---|---|---|
| EP | 773519 | * | 5/1997 |
| JP | 01118158 | * | 1/1999 |
| JP | 2001266954 | * | 9/2001 |

* cited by examiner

*Primary Examiner*—Pia Tibbits

(57) ABSTRACT

A system and method particularly suited for the re-charging of portable devices includes a charger having a charge port adapted for wired, contact, or contactless re-charging. Although the charger could be wired for connection to an electrical outlet, the charger is preferably wireless, and is either solar powered, or it can operate on batteries or fuel cells. The charger can be enabled/disabled by a payment unit depending on whether or not payment has been received from a user, and whether the amount paid is sufficient. The payment unit permits the charger to provide a charge for a predetermined amount so that the user can contactlessly recharge a device within a predetermined distance of the charge port. The type of device to be recharged and amount of recharge desired can be selected by a user directly, or after receiving a recommendation regarding the optimal/typical amount of recharge to be provided. A wireless charging unit permits recharging of the power source of a device in unconventional locations.

27 Claims, 2 Drawing Sheets

SYSTEM AND METHOD FOR CHARGING USERS TO RECHARGE POWER SUPPLIES IN PORTABLE DEVICES

FIELD OF THE INVENTION

The present invention is related to wireless power transfer systems. More particularly, the present invention is related to systems to charging to devices with a compensation component to the providers of such systems.

BACKGROUND AND SUMMARY OF THE INVENTION

The number and type of portable electrical devices and electronic devices in use today is growing at a faster pace than ever. Many of these devices include batteries, in order for the device to be used without attachment to a power cord or wall socket. It is more and more common that rechargeable batteries are used so that the expense of battery replacement and the sometimes cumbersome task of opening these devices to replace the batteries are reduced. Thus, the devices must be recharged, which can be difficult to accomplish in a portable device, for example, when someone is traveling, and lacks the ability to plug-in a charger. Sometimes, although a charging cord could be run to the device, it still might be considered inconvenient to do so.

Some examples of such portable electronic devices include cellular telephones, tape recorders, compact disc players, computers, personal data assistants (PDA), hand-held video games, telemetry equipment, two-way radio, and wearable fabrics that have electronic wiring woven into to the fabric itself, such as coils formed in any arbitrary shape to facilitate woven wire arranged in the fabric, or pads with embedded conductors that can be attached to clothes.

Wireless power transfer has been used in applications such as the non-intrusive charging of pacemaker batteries, the charging of hybrid vehicle batteries, etc. In such applications, inductive coupling is used exclusively so that a current is induced from a power station to a load. In such systems, the power transfer is exclusively accomplished by means of coupling magnetic flux of the power station and the load.

U.S. Pat. No. 5,608,771 to Steigerwald et al. discloses a contactless power transfer system, wherein power is transferred from a stationary supply to a rotational load via the use of a rotary transformer. The coupling in this type of system is also inductive. Another arrangement is the use of a clamp-on link around a primary conductor that does not physically contact the conductor. The transfer of power is still via induction.

In U.S. patent application Ser. No. 10/170,034, filed Jun. 12, 2002, the instant inventor provided a wireless charger to recharge portable devices, eliminating the hurdle of trying to find an outlet and a cord to recharge such devices. Moreover, there are times when a wall connected outlet is not desirable for safety reasons, for example, to prevent electrical shock in a kitchen or bathroom.

However, the proliferation of such wireless charging device's begs the question of how will this wireless charging be paid for?

One answer is to include a payment unit/mechanism as either an additional part of the charging system or as an add-on. A credit card reader or other form of payment mechanism can be placed and coupled to a charging device. Once payment is made, the mechanism enables the charge transfer from wireless charger to the "to-be charged" device.

The registration of payment can be stored in the payment mechanism for later retrieval, or can be connected via wired or wireless to a payment center and/or the Internet and only periodically carry out the completion of the financial transaction.

An advantage of the present invention is that it facilitates the use of wearable electronics. For example, flexible materials (such as FR4), and flex circuits used in wearable electronics, so that, for example, one could charge a radio, cellphone, and/or computer (just to name a few of the many wearable items) by bringing the device in close proximity to the fabric, and be charged for receiving the service.

DETAILED DESCRIPTION OF THE INVENTION

The following description is provided for purposes of illustration, and not for limitation. There are many different configurations that are well within the spirit of the invention, and the scope of the appended claims.

Figure 1:
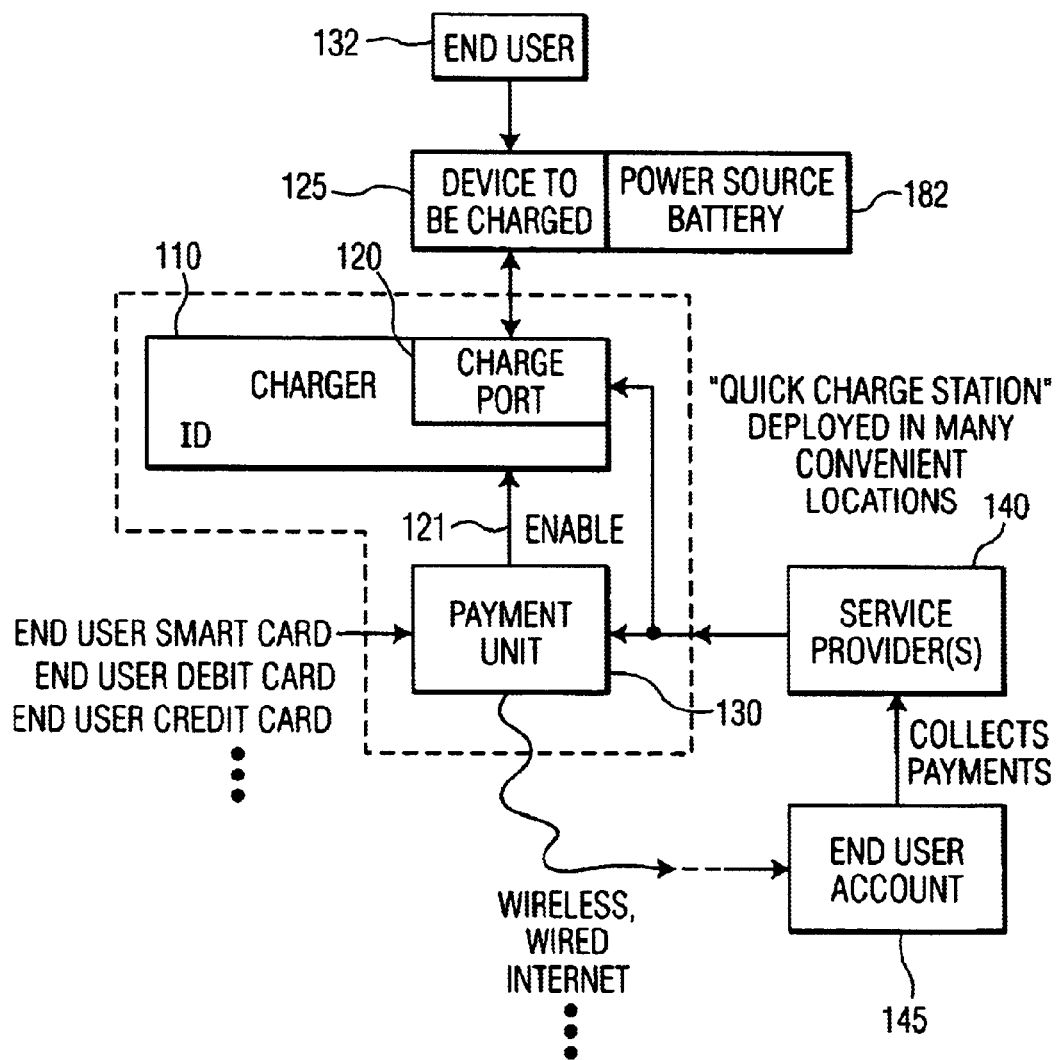
FIG. 1 is a diagram showing one aspect of the present invention.

FIG. 1. illustrates one of the various aspects of the present invention. A charger 110, has a charge port 120 for charging of a device 125. The type of re-charging of a device could be, for example, inductive, capacitive or ohmic. The charger itself could be a "wired" charger, meaning that it connects to an electrical outlet, or it could be a charger that runs on batteries, such as lithium ion, nickel hydride, alkaline, just to name a few of the many possible battery types. Preferably, the charger would be a solar powered charger, so that it could be placed virtually anywhere without the need to hard wire an electrical connection. The charger will, of course, have a charging circuit commensurate with whether the charging is by alternating current or direct current.

The charger 110 may or may not have an intermediate storage facility to hold/store charge when a device is not being recharged, or the amount of power to recharge the device is less than the output of the batteries/charging circuit.

It is possible that the charge port 120 optionally includes a port for wire charging (by contact), for example, when wireless charging is not practical, or the contactless charging might take too long as compared with the wired charging.

It is envisioned that the charger 110 would be enabled by a payment device 130, which, for example, could be a card reader that reads smart cards, debit cards, credit cards, check cards, the optical characters encoded on the bottom of a check, etc. Moreover, there are systems in use today in which a cell phone can be used to make purchases of, for example, soda from a vending machine.

Such systems can be employed in the device to be charged (if, for example, the device is a cell-phone or pager), so that, for example, the costs to recharge are incurred by the telephone user. Furthermore, a capacitive coupling, for example, such in the EZ Pass wireless toll collection system, or the SmartPass toll collection system, could be used to identify the account of the device to be recharged, and a recharging fee could be incurred to the device's online account.

However, if the payment system uses a smart card, debit card, credit card, etc., etc., there would need to be a link to a Service Provider 140 of, for example Visa card accounts, American Express card accounts. The link to the service provider 140, could be made by fiber optic cable, telephone cable, T1, wireless Lan, Wan connections, or other types of wired and wireless connections.

Upon verification, for example, of a user's credit card number, the charge port can be enabled to supply charge to the device 125.

Alternatively, the user's payment information could be held in the payment device or a storage area and only updated periodically. In such cases, the charger could default to an enabled status to permit charging, and user verification and/or payment would not occur until after the end user 132 finished charging his device 125. It is even possible that the user would enter some type of access code and a verification number in lieu of a credit card.

The service provider 140 could then retrieve payment from the end user's account 145 and notify the user 132 that a payment was deducted. The connection from the payment device to the Service Provider 140 could be by any of copper wire, Lan, Wan, Internet, fiber optic, wireless, etc. The payment device may be in communication with the end user account via the Internet, wired, or wireless, but in a best mode, it is envisioned that a service provider 140 would act as a go-between the payment device 130 and the end user account 145.

Figure 2:
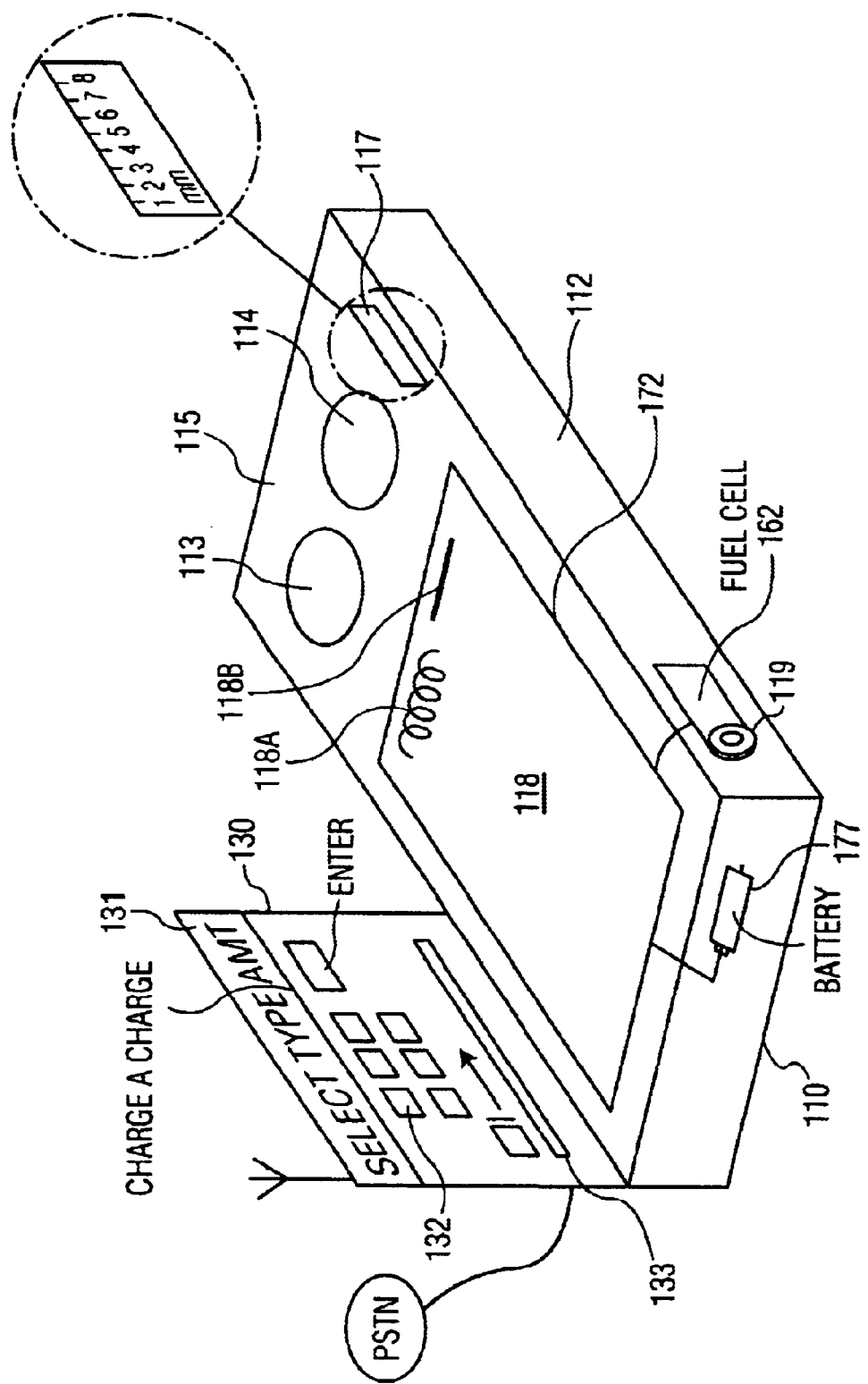
FIG. 2 shows a perspective view of another aspect of the present invention.

FIG. 2 shows one embodiment of a contact charger having a payment device in communication therewith. Applicants note that these drawings are submitted for purposes of illustration, not for limitation, and there are many variations of the present invention that can be practiced within the spirit of the appended claims. The charger 110 is configured in the form of a flat pad 112 that provides a common mounting and encasing for solar cells 118.

It should be noted that the cells could be fuel cells 162 as well. In addition, as solar cell 118 generates energy to recharge power cells, it can also be referred to as an energy generation unit. Of course, batteries 177 can be a possible energy generation source. The energy generated by the solar panel may be sufficient to physically connect to the device to be charged (125 FIG. 1) or inductive recharging via primary winding 118a, or capacitive recharging via plate/wire 118b can recharge the batteries/power source (182 FIG. 1) "contactlessly". In the case of inductive recharging, the primary coil 118a is charged and a current is induced across the device to be charged which has a secondary coil (not shown) connected to its batteries 182. Capacitive charging uses a wire or plate, and the air between them a wire or plate of the device (not shown) is connected to battery 182. The capacitive charging works by the wire or plate of the device being coupled to the wire or plate of the charger 118b, with the air acting as a dielectric. The solar cell 118 us exposed to light impinging on the pad 112. The top surface of the pad 115 includes charging ports 113, 114, which hold the device to be charged 124 (having a power source) in an orientation to bring the primary transformer winding 118a/wire or plate 118B of the charger 110 into proximity with the secondary transformer windings (not shown) in the device to be charged 125, so that its batteries 182 may be charged through magnetic induction or capacitive charging. Template 117 is marked with a distance in, for example, millimeters, so that the device to be charged can be arranged on a predetermined distance from primary winding 118a or wire/plate 118b. There is also an optional fuel port 119 if the charger uses a fuel cell 162 that is attached to the energy generation unit 172. The charger is preferably solar powered via solar cell 118. The solar cell could also be positioned in another area, according to desire.

The payment device 130 in this particular case has an LCD display 131, a series of buttons 132, and a slot, for swiping a credit card. The payment device could connect with a service provider via Internet, wired, wireless, fiber optic, etc. Also, the payment device could be connected to an electrical outlet, as well as the charger. If the charger uses electricity from a standard outlet, then there would be no need for solar cells. However the device would tend to lose some of its convenience in that it can be used anywhere outdoors.

The display screen 131 (which is described as an LCD screen but can be any type of screen known, so long as it can display characters in a given language) may also display prompts that ask the user the type of the device, the status of the batteries, etc. and provide a recommended recharging amount based on the prompted information. In the case of contactless charging, the display may tell the user a recommended distance to arrange the device near the charging port, and a template 117 may be provided so that the user has a guide regarding the recommended distance.

Inside the payment device 130, there is an interface (e.g. 1394, RS-232, LPT1, etc.) so that the payment device can communicate with the charger. The enablement of the charger can be by hardware (enable/disable switch 121), firmware, software, or any combination between the payment device and the charger. The payment device, for example, could set a latch in the charger that permits charging.

The amount charged to the user can be set up according to need, in time (e.g. second) amount of power used (e.g. microwatt hours or milliwatt hours), or even according to the type of device being recharged. The buttons on the keyboard 131, 132, could be used to select the type of device being charged. The strength of the recharging could also be based on the type of device 125 to be charged.

With regard to a method, a user with a portable device suited for re-charging can be prompted to select the type of device to be recharged, or to merely enter the amount of money that is desired to be spent on recharging. After a payment unit receives payment (and may verify with a service provider, particularly if payment is made by a credit or debit card rather than a "smart" card), the user will be prompted to place the device within a certain proximity of the charging port. Once the charging is complete, the user may be signified that the charging process has ended.

It should be noted that while the system for monetary payment for recharging portable electric or electronic devices is beneficial no matter whether the device to be recharged (and the charge port of the charger) are wired, use contacts (such as a cordless telephone and its charger), or are contactlessly recharged.

While is it preferable that the charger itself is a solar-powered charger, it is within the spirit of the invention and the scope of the appended claims to have a charger that is powered by batteries, fuel cells, or wired to an outlet. The time needed to recharge a device would in all likelihood be faster than a contact/wired recharge than a contactless recharging system, but a wired recharging system requires cables that can plug into the device to be recharged.

What is claimed is:

1. A system for the re-charging power sources of portable devices, comprising:
   a charger adapted for recharging a power source of a device by contact, and by at least one of contactless recharging with the power source of the device, said charger including a charge port to which the device needing a power source recharged is arranged on to recharge the power source of the device;
   said charger including an energy generation unit for providing energy to recharge a power source of the device, and said charger further includes an enable/disable switch in connection therewith;
   a payment unit for receiving payment from a user;
   wherein said payment unit after receiving payment enables the enable/disable switch to permit the charger to provide a charge for a so that the user can recharge device.

2. The system according to claim 1, wherein the charger comprises a cordless charger that is solar powered, and said energy generation unit includes:
   a solar cell arranged on an upper surface of the charger so as not to require connection with a power outlet for operation; and
   wherein the solar cell is connected with at least the charge port to provide a recharging to the power source of a device to be recharged.

3. The system according to claim 1, wherein the charger is powered by one of batteries and fuel cells, wherein said one of batteries and fuel cells being arranged in a port for housing a respective one of batteries and fuel cells, and an electrical output of said one of batteries and fuel cells being in electrical contact with the energy generation unit.

4. The system according to claim 1, wherein the charger is adapted for contactless inductive recharging of the power source of the device wherein the energy generation unit of the charger includes a primary transformer winding; and
   wherein a secondary transformer winding of the device to be charged is coupled with the power source of the device, said secondary transformer receives energy inductively from the primary transformer winding without physically contacting the primary transformer winding, and the secondary transformer winding provides the inductive recharging to the power source.

5. The system according to claim 1, wherein the charger contactlessly recharges the power source by contactless capacitive charging, wherein the energy generation unit comprises at least a first wire with a voltage thereon and the device being arranged in the charge port so that a portion of the voltage on the wire is transferred to a second wire of the device, wherein said first wire and second wire having air therebetween.

6. The system according to claim 1, wherein the payment unit includes a card reader for reading at least one of a credit card, smart card, and debit card.

7. The system according to claim 1, wherein the payment unit includes a keypad for entry of payment/user information, and a display screen to prompt the user and display entries typed by the keypad.

8. The system according to claim 1, further including a service provider for retrieving payment, said service provider being in communication with the payment unit.

9. The system according to claim 8, wherein the payment unit and the service provider communicate via the Internet.

10. The system according to claim 8, wherein the payment unit and the service provider communicate via one of a local area network and a wide area network.

11. The system according to claim 8, wherein the payment unit communicates with an end user's account to directly debit payment.

12. The system according to claim 4, wherein the payment unit includes a keypad for entry of payment/user information, and a display screen to prompt the user and display entries typed by the keypad; and
   wherein the charger displays on the screen that the device to be recharged is to be placed near the charge port to optimize recharging of the device.

13. The system according to claim 7, wherein the display screen of the charger prompts the user to select a power source of the device to be recharged.

14. The system according to claim 7, wherein the display screen prompts the user to select the amount of recharge desired.

15. The system according to claim 14, wherein the amount of recharge to be provided is specified in one of a monetary amount and a time selected by the user.

16. The system according to claim 14, wherein the amount of recharge to be provided is specified in milliwatt hours.

17. The system according to claim 14, wherein the charge includes recommended recharging amounts that are displayed on the screen in response to a user selecting the type of device to be recharged.

18. The system according to claim 12, further comprising a template marked with distance to guide the user to place the device within the optimal distance for recharging.

19. A method for recharging a power source of portable devices, comprising the steps of:
   (a) providing a charger having a charge port adapted for recharging a power source of a device;
   (b) receiving payment from a user by a payment unit to recharge a power source of a device;
   (c) enabling the charger to permit recharging of the power source of the device commensurate with the amount of payment received by the payment unit;
   wherein the charger permits both contact and contactless recharging of a respective power source.

20. The method according to claim 19, wherein step (a) further includes:
   (i) prompting a user to identify a type of device to be recharged; and
   (ii) providing a user with a recommended charging dependent on the type of device identified in sub-step (a)(i).

21. The method according top claim 19, wherein step (a) further includes:
   (i) prompting a user to identify a charge status of batteries used by the device; and
   (ii) providing a user with a recommended charging amount based on a charge status of batteries in the device.

22. The method according to claim 19, wherein step (a) further includes:
   (i) prompting a user to enter a desired amount of recharging.

23. The method according to claim 22, wherein the amount of recharging is requested as one of (1) time; and (2) milli/micro-watt hours.

24. The method according to claim 19, wherein step (b) further comprises verifying with a service provider that a payment entered by a user is valid.

25. The method according to claim 24, wherein the service provider is remotely situated and communicated with via the Internet.

26. The method according to claim 19, wherein the payment received is one of credit card, smart card and debit card.

27. The method according to claim 19, wherein the contactless recharging comprises at least one of capacitive and inductive recharging.

* * * * *